US007248564B1

(12) United States Patent
Grosdidier et al.

(10) Patent No.: US 7,248,564 B1
(45) Date of Patent: Jul. 24, 2007

(54) METHOD FOR DETERMINING NETWORK CONGESTION AND LINK CAPACITIES (75) Inventors: Gilbert Grosdidier, Gif-sur-Yvette (FR); Minh Duong-van, Menlo Park, CA (US); Tomas J. Pavel, San Jose, CA (US); Han C. Wen, San Jose, CA (US); Ian Adam, San Mateo, CA (US); Richard Blanckenbecler, Stanford, CA (US)

(73) Assignee: Network Physics, Inc., Mountain View, CA (US)

( * ) Notice: Subject to any disclaimer, the term of this patent is extended or adjusted under 35 U.S.C. 154(b) by 587 days.

(21) Appl. No.: 09/854,321

(22) Filed: May 11, 2001

Related U.S. Application Data (63) Continuation-in-part of application No. 09/846,451, filed on Apr. 30, 2001.

(51) Int. Cl.
*H04L 12/26* (2006.01)
(52) U.S. Cl. ..................................... 370/235
(58) Field of Classification Search ................ 370/203, 370/210, 229, 235, 236, 252, 253, 389, 392, 370/394, 395.4, 400, 508, 517
See application file for complete search history.

(56) References Cited

U.S. PATENT DOCUMENTS

| 5,367,523 A | 11/1994 | Chang et al. |
| 5,400,329 A | 3/1995 | Tokura et al. |
| 5,426,640 A | 6/1995 | Hluchyj et al. |
| 5,439,483 A | 8/1995 | Duong-Van |
| 5,583,792 A | 12/1996 | Li et al. |
| 5,646,943 A | 7/1997 | Elwalid |
| 5,751,969 A | 5/1998 | Kapoor |
| 5,930,364 A | 7/1999 | Kim |
| 5,995,488 A | 11/1999 | Kalkunte et al. |
| 6,014,694 A | 1/2000 | Aharoni et al. |
| 6,046,988 A | 4/2000 | Schenkel et al. |

(Continued)

FOREIGN PATENT DOCUMENTS

EP 0 817 433 A2 1/1998

(Continued)

OTHER PUBLICATIONS

John P. Pippas, et al., "Shaping Aggregate LAN Flows for Transmission over ABR Connections," XP-000830899, Communication Networks, vol. 10, No. 1, pp. 45-56 (Jan. 1999).

(Continued)

*Primary Examiner*—Chi Pham
*Assistant Examiner*—Anh-Vu Ly
(74) *Attorney, Agent, or Firm*—Blakely, Sokoloff, Taylor & Zafman LLP (57) ABSTRACT

Packet round trip times (RTT) within a communication network are measured and from those measurements information regarding congestion conditions within the network is extracted. The RTT measurements are organized into an invariant distribution (a histogram) and an analytical tool which is designed to reveal periodicity information (such as a Fourier or wavelet transform, etc.) is applied to the distribution to obtain a period plot. From this period plot, bandwidth information (indicative of the congestion conditions and/or link capacities within the network) can be obtained.

14 Claims, 7 Drawing Sheets

U.S. PATENT DOCUMENTS

| | | |
|---|---|---|
| 6,075,770 A | 6/2000 | Chang et al. |
| 6,201,791 B1 | 3/2001 | Bournas |
| 6,219,713 B1 | 4/2001 | Ruutu et al. |
| 6,249,530 B1 | 6/2001 | Blanco et al. |
| 6,477,143 B1 | 11/2002 | Ginossar |
| 6,560,231 B1 | 5/2003 | Kawakami et al. |
| 6,584,111 B1* | 6/2003 | Aweya et al. ............... 370/412 |
| 6,600,721 B2 | 7/2003 | Edholm |
| 6,614,763 B1 | 9/2003 | Kikuchi et al. |
| 6,643,259 B1 | 11/2003 | Borella et al. |
| 6,674,717 B1 | 1/2004 | Duong-van et al. |
| 6,684,247 B1* | 1/2004 | Santos et al. ............... 709/224 |
| 6,757,255 B1* | 6/2004 | Aoki et al. ................. 370/252 |
| 6,766,309 B1* | 7/2004 | Cheng et al. ................... 706/3 |
| 6,826,151 B1 | 11/2004 | Li et al. |
| 7,072,297 B2 | 7/2006 | Grosdidier et al. |
| 2001/0015956 A1* | 8/2001 | Ono ........................... 370/229 |
| 2001/0032269 A1* | 10/2001 | Wilson ....................... 709/235 |
| 2002/0099854 A1 | 7/2002 | Jorgensen |
| 2002/0118649 A1 | 8/2002 | Farley et al. |
| 2002/0118661 A1 | 8/2002 | Voce |
| 2002/0159386 A1* | 10/2002 | Grosdidier et al. ......... 370/229 |
| 2002/0169880 A1 | 11/2002 | Loguinov et al. |
| 2003/0193893 A1* | 10/2003 | Wen et al. .................. 370/231 |

FOREIGN PATENT DOCUMENTS

| | | |
|---|---|---|
| WO | WO 00/02356 A | 1/2000 |
| WO | WO 01/76160 A1 | 10/2001 |

OTHER PUBLICATIONS

Nguyen C. Trinh, et al., "Dynamic Resource Allocation for Self-Similar Traffic in ATM Network," XP-002169395, Proceedings APCC/OECC '99, pp. 160-165 (Oct. 18-22, 1999).

John Nagle, "On Packet Switches with Infinite Storage," Network Working Group, Internet Engineering Task Force, RFC 970 (1985).

Van Jacobson and Michael J. Karels, "Congestion Avoidance and Control," Proceedings of SIGCOMM '88, ACM, Stanford, CA (Aug. 1988).

W. Richard Stevens, "TCP/IP Illustrated, vol. 1: The Protocols," Addison-Wesley Publishing Company, pp. iii-xiv and 275-322 (1994).

Gary R. Wright and W. Richard Stevens, "TCP/IP Illustrated, vol. 2: The Implementation," Addison-Wesley Publishing Company, pp. vi-xviii and 817-1005 (1995).

* cited by examiner

METHOD FOR DETERMINING NETWORK CONGESTION AND LINK CAPACITIES

RELATED APPLICATION

This application hereby claims the priority and benefit of and is a continuation-in-part of co-pending U.S. patent application Ser. No. 09/846,451, entitled "METHOD OF REDUCING PACKET LOSS BY RESONANCE IDENTIFICATION IN COMMUNICATION NETWORKS", filed Apr. 30, 2001.

FIELD OF THE INVENTION

The present invention relates to a scheme for determining congestion conditions in a communication network using characteristics of an invariant distribution of packet round trip times in such a network. Based on these congestion conditions, a control node of the network can be operated in such a way so as to reduce packet loss in the network.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. Such networks generally perform two major functions: routing and congestion control. The object of routing is to deliver, correctly and sometimes in sequence, the packets from a source to a destination. The object of congestion control is to maintain the number of packets within the network (or a region or sub-network thereof) below a level at which queuing delays become excessive. Due to finite resources, packets may be dropped rather than queued.

In essence, a packet switched network is a network of queues communicatively coupled together by communication links (which may be made up of various physical media). At each network node (e.g., a switch or router), there exist one or more queues of packets for each outgoing link. If the rate at which packets arrive and queue up exceeds the rate at which packets are transmitted, queue size grows without bound and the delay experienced by a packet tends towards infinity.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no congestion control is exercised, as the load increases, use increases for a while. Then, as the queue lengths at various nodes begin to grow, throughput actually drops. This is due to the fact that the queues are constrained to a finite length by the physical size of the memories in which they exist. When a node's memory (i.e., its queues) is full, it must drop (i.e., discard) additional incoming packets. Thus, the source is forced to retransmit these packets in addition to any new packets it might have. This only serves to worsen the situation. As more and more packets are retransmitted, the load on the network grows more and more and more nodes become saturated. Eventually, even a successfully delivered packet may be retransmitted because it takes so long to get to its destination (whereupon it may be acknowledged by the destination node) that the source actually assumes that the packet was lost and tries to retransmit it. Under such circumstances, the effective capacity of the network can be virtually zero.

Contrary to what one might believe, the solution to this problem is not simply to allow the queue lengths to grow indefinitely. Indeed, it has been shown that even where queue lengths are allowed to be infinite, congestion can occur. See, e.g., John Nagle, "On Packet Switches with Infinite Storage", Network Working Group, Internet Engineering Task Force, RFC 970 (1985). One reason that this is true is that packets are often coded with an upper bound on their life, thus causing expired packets to be dropped and retransmitted, adding to the already overwhelming volume of traffic within the network.

It is clear that catastrophic network failures due to congestion should (indeed, must) be avoided and preventing such failures is the task of congestion control processes within packet switched networks. To date, however, the object of such congestion control processes has been to limit queue lengths at the various network nodes so as to avoid throughput collapse. Such non-TCP techniques require the transmission of some control information between the nodes and this overhead itself tends to limit the available network bandwidth for data traffic. Nevertheless, a good congestion control process maintains a throughput that differs from a theoretical ideal by an amount roughly equal to its control overhead.

Even these "good" congestion control processes, however, are not good enough. Studies of traffic flow across the Internet show that bandwidth of the various communication links is underutilized even in the presence of congestion. That is, even though excess capacity exists on the communication links that couple various nodes of the Internet to one another, packets are still being dropped within the network. One reason that conventional congestion control processes have failed in this fashion is that such processes do not take into account the true nature of network traffic.

Existing congestion control approaches have generally viewed network traffic (e.g., the generation of new packets to be injected into a network) as essentially random processes. However, recent work in the area of traffic modeling has shown that network traffic is in fact chaotic in nature. None of the currently proposed congestion control methodologies capture or exploit this characteristic.

Figures 1, 2:
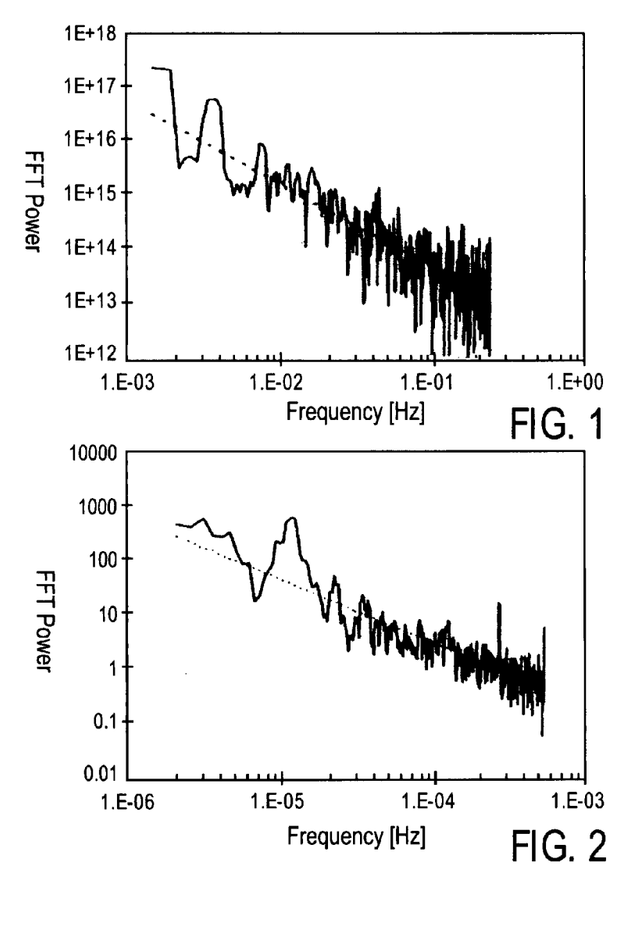
FIG. 1 shows the Fourier power spectrum of traffic generated from a Pareto distribution of file sizes that is not subjected to the TCP protocol.
FIG. 2 shows the Fourier power spectrum of uncongested and under-supplied traffic that is subjected to the TCP protocol.
Figure 3:
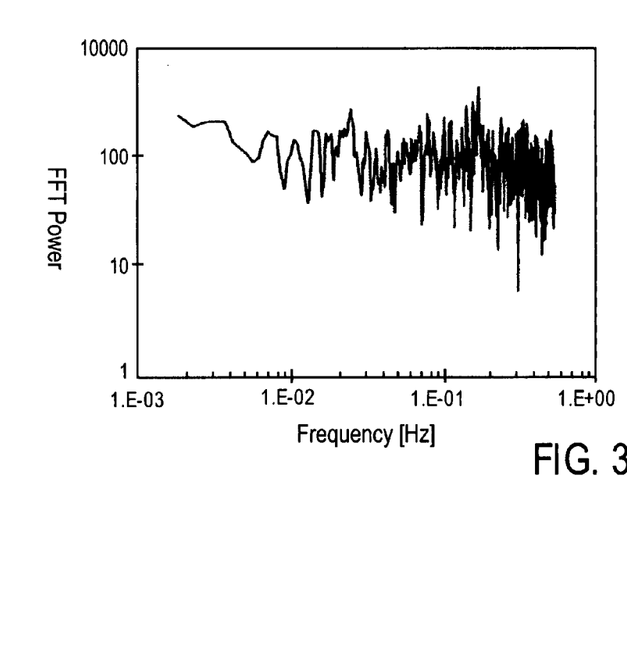
FIG. 3 shows the Fourier power spectrum of congested and over-supplied traffic that is subjected to the TCP protocol.

Other studies from the academic community have shown that the time series of network traffic throughput is not Poisson, but fractal. Namely, the "bursty" behavior seen in a time series at a given time scale is also seen at all other time scales. This "self-similarity" is one of the signatures that characterize a fractal time series. However, as explained in the above-referenced co-pending application, the present applicants have discovered that this "self-similar" signature is not present for heavily congested network traffic. Instead, the present applicants have verified that the traffic generated without any TCP protocol exhibits a fractal time series if the files transmitted are drawn randomly from a Pareto distribution of file sizes. The Fourier power spectrum in this case is a power law that on a log—log scale is linear, as shown in FIG. 1. This power law behavior is another signature of a fractal time series. The present applicants have also discovered that traffic flow with TCP protocol is also fractal, but only if the network topology is under-supplied with traffic. In this situation, the only significant portion of the TCP protocol responsible for the traffic dynamics is the receiver's window size. See FIG. 2. However, when the network topology is congested with traffic, the packet losses coupled with the non-linearity of the TCP congestion avoidance algorithm results in a time series that loses its fractality and multi-fractality. The corresponding Fourier power spectrum shows no power law behavior and is shown in FIG. 3. Even though the time series is not fractal, it is still chaotic.

The term "chaos" is used to describe the apparently random behavior exhibited by many deterministic nonlinear dynamical systems. Such systems manifest a rather remarkable phenomenon in that their deterministic property implies that all future states are determined from the present state. Thus, on one hand there is complete future knowledge of the system, while on the other there is seemingly random motion.

Chaos then is the long-term aperiodic behavior of a deterministic, nonlinear, dynamical system that exhibits sensitivity to initial conditions. Aperiodicity is the property that orbits never repeat themselves exactly; however they may get arbitrarily close to doing so, as observed in periodic windows. The other, perhaps more important, property is the sensitivity of the system to tiny perturbations. Consider two given points in phase space that are distinct but lie arbitrarily close to each other, then one might assume that their orbits will remain close forever. In fact, just the opposite is observed; the orbits separate exponentially in a bounded region of state space.

As indicated above, current congestion control processes simply do not take the chaotic network traffic characteristics into account and, therefore, cannot be expected to be optimum solutions to the congestion problem. To understand why network traffic is chaotic in nature, consider the Internet infrastructure and a series of packet transmissions between a source and a receiver within the Internet.

The Internet infrastructure is complex, with many interconnections between routers. For a given router, there are both incoming connections from various sources and outgoing connections to various receivers. For the most part, the transmissions are controlled using the well-known transmission control protocol (TCP). Very early in the development of the modern Internet, it was discovered that some control over the manner in which packets were injected into the network by the source was needed.

Originally, TCP allowed a source to inject multiple packets into a network, up to a limit corresponding to a window or buffer size advertised by the receiver. Although such a scheme may work where the source and the receiver are connected to the same local area network, it was soon found that where routers having finite buffer sizes are disposed between the source and the receiver, problems arise as these routers soon run out of space to hold the incoming packets. To combat this problem Jacobson and Karels developed a "slow start" procedure wherein the source limits the rate at which it injects new packets into the network according to the rate at which acknowledgements of successful receptions are returned by the receiver. Van Jacobson and Michael J. Karels, "Congestion Avoidance and Control", Proceedings of SIGCOMM '88 (Stanford, Calif., August 1988), ACM.

Under the slow start procedure, a so-called congestion window is added to the source's TCP implementation. When a connection is established with a resource on another network, this congestion window is initialized to one segment (e.g., the segment or packet size advertised by the resource or a default packet size). Each time an acknowledgement is received, the congestion window is incremented and the source is allowed to inject a number of packets up to the minimum of the current congestion window size or the receiver's advertised window. Over time, the source's congestion window will grow exponentially until at some point the capacity of the intervening network is reached and some intermediate router begins dropping packets. This is an indication to the source that its congestion window has gotten too large. See, e.g., W. Richard Stevens, TCP/IP Illustrated, Vol. 1: The Protocols (1994) and Gary W. Wright and W. Richard Stevens, TCP/IP Illustrated, Vol. 2: The Implementation (1995).

At this point, and where the slow start process is run in concert with a conventional congestion avoidance procedure, the source resets its congestion window to one, and the process repeats up to the point at which the congestion window becomes half the size at which packet loss occurred previously. After this point, the congestion avoidance process takes over and begins incrementing the congestion window in a linear fashion (rather than in an exponential fashion as under the slow start process) in response to receiver acknowledgements.

This sudden change from an exponentially growing number of packets being injected to a linearly growing number of packets being injected presents a discontinuity. Such discontinuities are observed at the intervening router for each of the connections it is servicing. Moreover, the discontinuities appear at random as there is no synchronization between the different sources injecting packets into the network. It is the interaction between the discontinuities that result from the operation of the TCP and the randomness at which they are manifest at the routers within the network that gives rise to the chaotic nature of network (e.g., Internet) traffic.

In such a system it would seem that there is little or no ability to estimate congestion conditions, especially congestion conditions downstream of a point of interest. Nevertheless, in order to control congestion, the ability to accurately make such estimates is critical. The present invention addresses these needs.

SUMMARY OF THE INVENTION

Packet round trip times (RTT) within a communication network are measured and from those measurements information regarding congestion conditions within the network is extracted. The RTT measurements are organized into an invariant distribution (a histogram) and an analytical tool which is designed to reveal periodicity information (such as a Fourier or wavelet transform, etc.) is applied to the distribution to obtain a period plot. From this period plot, bandwidth information (indicative of the congestion conditions and/or link capacities within the network) can be obtained.

The bandwidth information may be used to set a control bandwidth for a node of the network. This node may be a sever, router, switch or other until/monitoring node along a traffic route within the network. The control bandwidth may be set by adjusting the inter-packet transmission times at this node. In effect, the queue depth of the node is regulated to provide an output traffic flow at a bandwidth approximately equal to an identified bandwidth bottleneck. This will help to ensure that packet loss and fetch times are minimized. Of course, as the congestion conditions change, the inter-packet transmission times (i.e., the control bandwidth) may be adjusted accordingly.

In a further embodiment, inter-packet transmission times at a node of a network are controlled according to network congestion condition determined by measurements of packet RTTs. An invariant distribution of the RTT measurements is used to provided bandwidth information regarding one or more congested links within the network. From the bandwidth information, bandwidth bottlenecks can be identified.

The bandwidth information may be extracted from the invariant distribution of RTT measurements using any of a number of analytical tools which will reveal periodicity information in the distribution. Examples of such tools include the Fourier transform and the wavelet transform. These tools may be implemented in hardware or software.

Still another embodiment provides a method of estimating congestion in a network using bandwidth bottleneck information obtained from the above-described RTT measurements. This information may be extracted from an invariant distribution of such measurements (e.g., using tools such as these discussed above), and may be subsequently used to set packet transmission times at one or more nodes of the network.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A scheme for determining network congestion conditions is disclosed herein. As discussed in greater detail below, the present scheme allows for estimating the particular congestion conditions of downstream communication links as well as the congested bandwidth characteristics, regardless of whether the congestion is self-induced or cross-induced. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope. It should also be noted that as used herein the term "packet" is meant to broadly refer to packets, cells and other forms of information units used to transport data and/or control information within communications infrastructures (e.g., computer networks, telecommunications networks, data communication networks and the like, for example, the Internet) wherein resources are shared among multiple users and multiple information or traffic streams. The present control techniques may be applied at a per connection, per traffic stream or other level.

Figure 4:
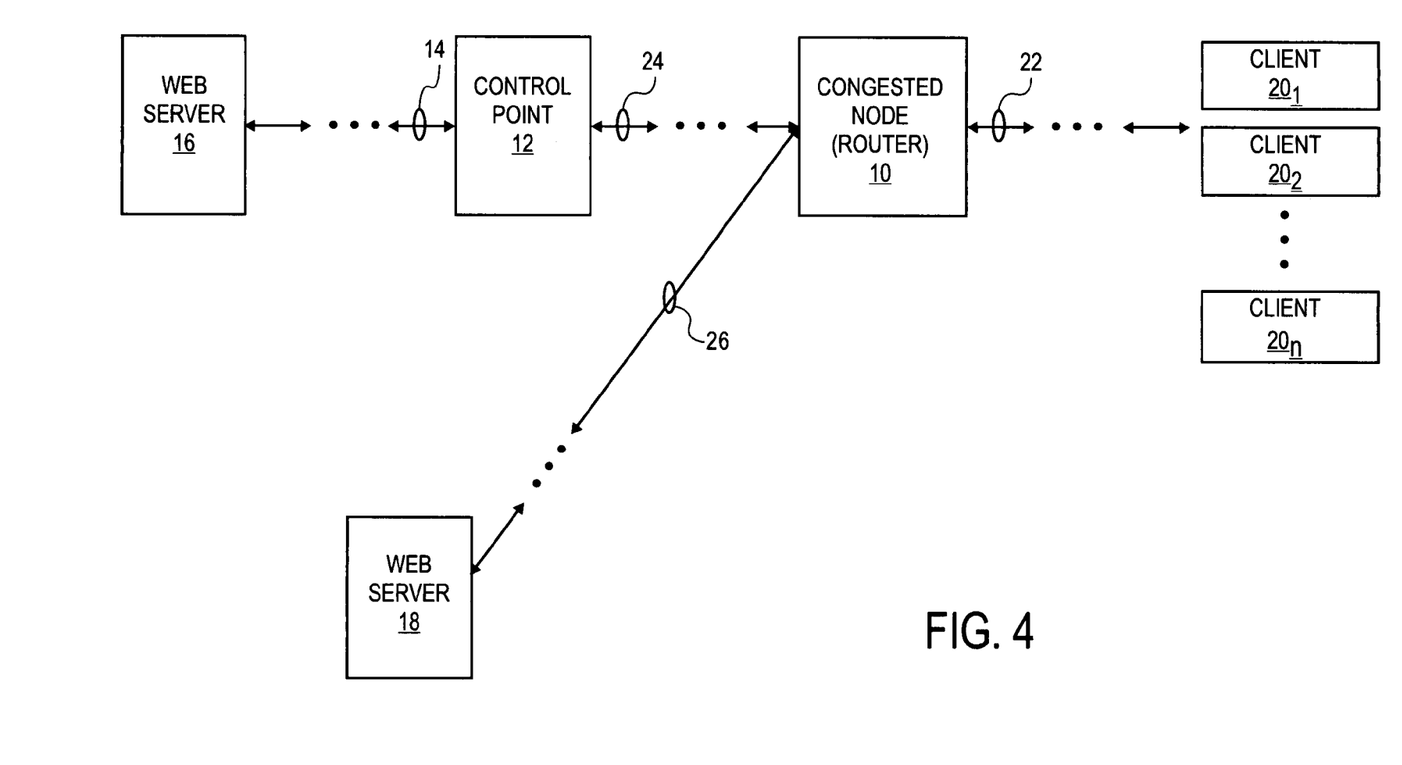
FIG. 4 illustrates an example of a computer network having a control node upstream of an otherwise congested node in accordance with an embodiment of the present invention.

Sources of congestion within a network can be understood with reference to FIG. 4. Shown in this illustration is a router (or other network node, such as a switch, bridge, etc.) 10, which is connected in a communication path between a traffic source of interest, such as Web server 16 and one or more clients $20_1, 20_2, \ldots, 20_n$. A control or monitoring point 12 (which is discussed in greater detail below) may be connected between the content source 16 and the congested node 10, for example via communication links 14 and 24. In some cases, the functionality of control point 12 may be included within router 10 and/or Web server 16. Communication with the clients 20 from router 10 may be over one or more communication links 22.

The connections that exist through router 10 generally will not have equal bandwidths. That is, some bandwidth mismatch will often occur at nodes such as router 10. Often the communication link coupling the network node to the content source (i.e., link 24 in this example) will have a greater bandwidth than the communication link coupling the node to a client (i.e., link 22 in this example).

Whenever a bandwidth mismatch of this type occurs, some packet buffering will be required. Hence, router 10 in equipped with one or more buffers (not shown), which are configured to store packets received from the traffic source until they can be transmitted on to the clients 20. These transmissions usually occur at some periodic interval, usually defined by a scheduler in router 10 (not shown). The scheduler allows packet transmissions to take place depending upon the bandwidth of the outgoing communication link, customer subscription agreements and/or other network conditions.

In addition to the traffic of interest, router 10 may also be in the communication path for one or more other traffic streams, some of which may be bound for clients 20 and others of which may be bound for other nodes in or coupled to the network. This cross-traffic (e.g., from a content source such as Web server 18) may exist on one or more communication links 26 and may also involve packets being buffered at router 10 for some period of time.

As discussed above, congestion will occur at router 10 when its buffer (and assume for the moment that all available buffers at router 10 may be regarded as a single storage unit) is full and new packets arrive before old packets can be transmitted out of the buffer. In such a case, packets will be dropped. This situation may occur for either of two reasons. First, in cases where there is little or no cross-traffic, or stated differently, where all of the traffic seen by the buffer is traffic of interest from Web server 16, then the packets that are dropped will be packets of the traffic stream(s) of interest. This is referred to herein as "self-induced congestion". That is, the congestion results primarily (or solely) as a result of traffic from the streams of interest.

The second situation involves cases where there would be no congestion but for the presence of cross-traffic from Web server 18. That is, the buffer overflows (and subsequent packet drops) are a result of heavy cross-traffic. Not only are packets from this cross-traffic dropped, but so too are packets from the traffic stream(s) of interest dropped (because all packets must use the same buffer(s) in router 10).

This situation is referred to a "cross-induced congestion" to point out the fact that it is (primarily) due to cross-traffic on communication link 26.

While investigating the phenomena described above, the present applicants have discovered a technique for estimating and/or controlling congestion in such networks. In brief, a control point (such as control node 12) in a network is established and round trip packet times between the control point and some downstream point (or points) are monitored. The monitoring is performed so as to identify periodicities in the round trip times for packets transmitted in the network, and from those periodicities the nature of the network congestion may be extracted. The control point need not be a separate network node, and can often be the content server or a router or switch within the network. Indeed, the techniques discussed herein are applicable at any network node, including the client.

The present congestion estimation techniques work even in the presence of multiple congested links within a specific route. The reason for this is that the Internet, based on the TCP protocol, relies on feedback and so even if the monitoring point sits upstream of a congested link, that congestion can be discovered and characterized. Further, the existence of cross-traffic and the resultant buffer delays are used to measure the important bandwidths of the network, and hence the present methods will work in the presence of any type of bottleneck, either with severe or mild congestion.

For a congested route then, the strategy of the present method is to observe either the degree of packet loss of the route of interest or the round trip time (RTT) of packets traversing that route. Theoretically, it is expected that both characteristics need to be taken into account to characterize a congested link, and the present applicants have discovered that it is indeed so. However, the present applicants have also discovered that there is an intimate relationship between the packet loss and the RTT, such that to a first order in effect, one need only observe the RTT to obtain sufficient information for developing the congestion finding procedure discussed herein.

The essence of the present method can be described as follows. It is recognized that a congested router has packets arriving at non-uniform time intervals. However, stored packets leave the router at much more regular time intervals, which are dictated by downstream bandwidth. The present applicants have discovered that one quantity invariant to the timing of the packet arrival is the distribution of RTT values (this invariant distribution is also termed a histogram). Moreover, this invariant distribution yields physical signals that reflect the nature of the packets traversing congested links. By examining this invariant distribution, in all scales, one can extract the nature of the congestion. For example, when the packets leaving the congested link are uniform in time, then the invariant distribution of the RTT will yield a periodic occurrence of peaks.

To better understand the methodology of the present invention, consider a TCP session between a client and a server. As the server provides packets to the client, the client returns acknowledgement (ACK) packets to the server for every packet (or every n packets, depending on an ACK timer, typically n=2) it receives. All packets transmitted by the server have a sequence number included in the header of the packet and each ACK packet includes the sequence number(s) of the packet(s) for which it is an acknowledgement. Thus, in accordance with the present invention, the server (or other monitoring/control node) can determine the RTT of a packet by storing the sequence numbers and transmission time stamps of packets it sends to the client and comparing these with the receive time of the ACK packet which includes the appropriate sequence number(s). The RTT will be the resulting time difference between the packet transmission time and the receipt time of the corresponding ACK packet. These monitoring operations may be carried out at the traffic stream (or any other) level, as appropriate.

The RTTs thus recorded will be characteristic of the route between the server and the client (assuming there is no parasitic delay introduced by the client in sending the ACKs). After collecting a sufficient amount of data (which can be on the order of a few seconds, or even as little as one second, worth of data), these RTT values can be used to extract information regarding the physical bandwidths of the links between the server and the client, as described below.

Recall that when a train of packets is routed through a bandwidth mismatch, from higher to lower bandwidth as typically occurs when going from a server to a client, some packets must be temporarily buffered while waiting to be scheduled out at the speed of the downstream link. Thus, a packet "n+1" is transmitted from a router at a time "$\Delta t$" (msec) after packet "n" has been transmitted, where $\Delta t$ represents a time lag between packet transmissions and can be expressed as:

$$\Delta t = (\text{packet size, e.g., in kbits})/(\text{bandwidth of outgoing link, e.g., in Mbps}),$$

if the bandwidth of the outgoing link (i.e., the downstream link) is not congested.

If the outgoing link is congested, the time lag between two packets of the train is an integer multiple of $\Delta t$, depending on buffer queue depth. For example, with a standard 12 kbit TCP packet, and a 1.5 Mbps link, time lags of 8 msec (or multiples thereof) are expected.

Given the above, the round trip time (RTT) for packets traveling through a link with a time lag $\Delta t$ can be expressed as:

$$RTT = N^* \Delta t + RTT_0$$

With "N" being any integer value and $RTT_0$ being the basis RTT when there is no traffic on the route (assuming in this case the transmission delay fluctuations on the ACK packets are negligible). N is related to the occupancy of the buffer upon arrival of the packet in question.

Figure 5:
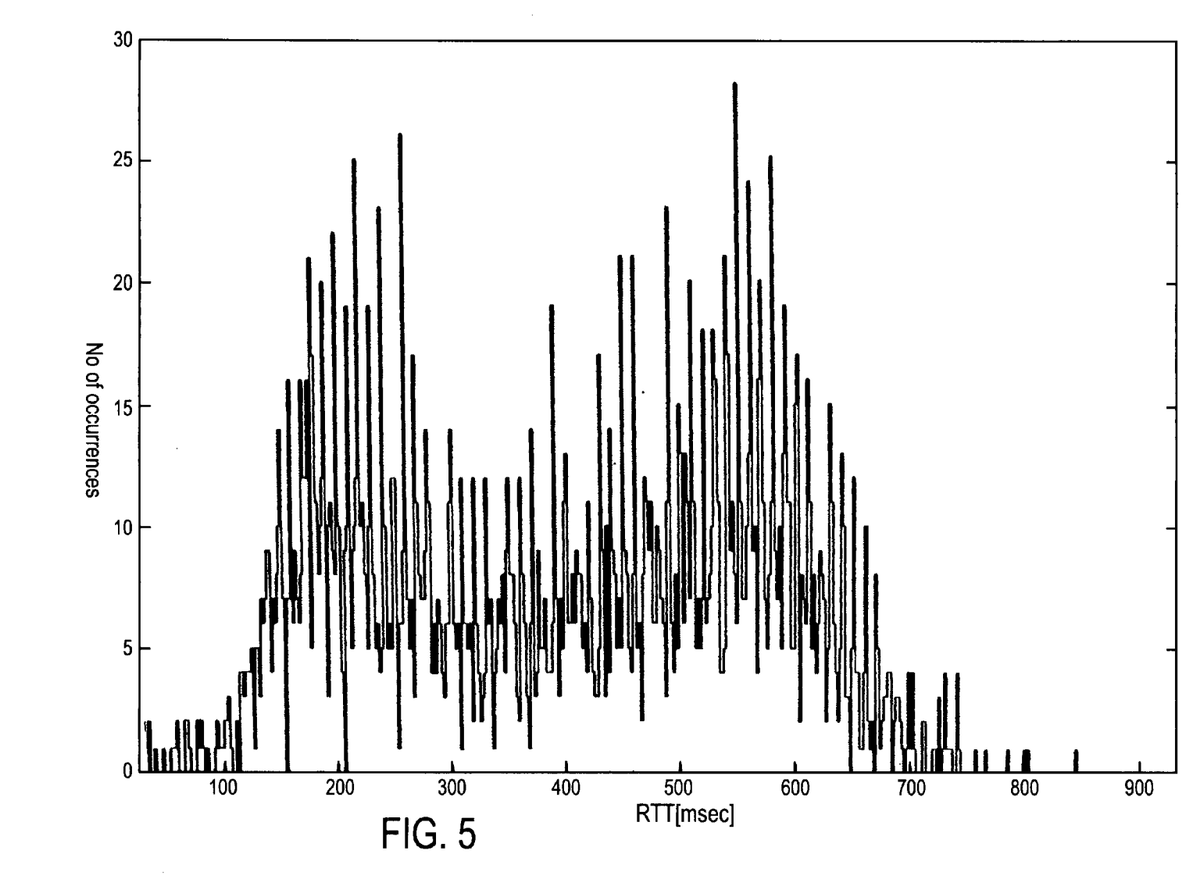
FIG. 5 is a histogram of packet round trip times for a real world network, which were collected for analysis in accordance with an embodiment of the present invention.

The consequence of the buffering is that the RTTs actually measured on the different packets of the packet train will differ from one another by an integer multiple of $\Delta t$ as well. In effect, the buffering provided by the routes at points of bandwidth mismatches has quantized the value of the RTT. Moreover, the histogram of these RTT values, instead of showing a single peak, will yield a series of peaks, each peak being separated from its nearest neighbors by an average value of $\Delta t$ msec (i.e., the time characteristic of the bandwidth of the outgoing communication link). An example of such a histogram is shown in FIG. 5, which displays a set of real world data for which the $\Delta t$ is 10 msec. The inter-peak time intervals can be thought of as the time required to schedule the next packet out of the buffer (and, thus the peaks represent different layers in the buffer and so characteristics of buffer occupancy are observed).

Figure 6:
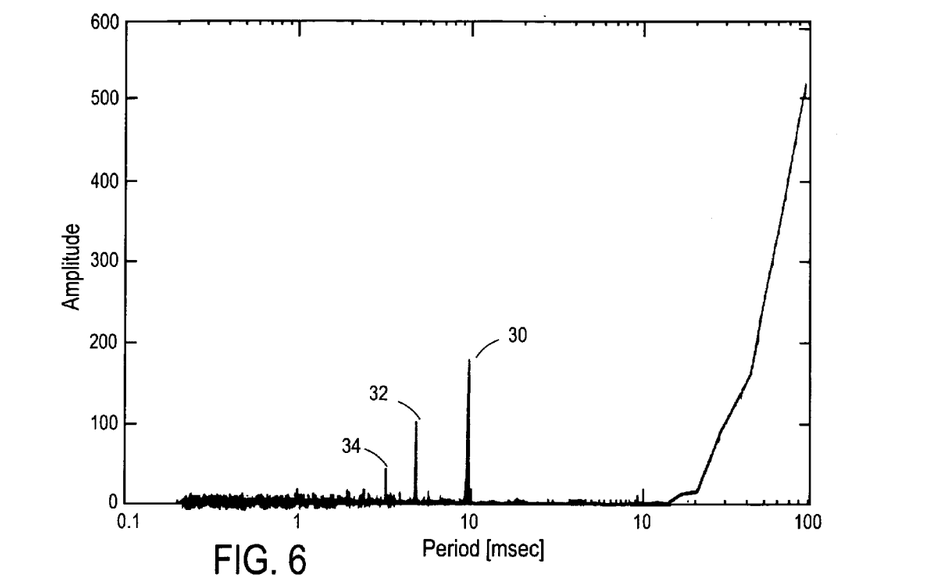
FIG. 6 is a power series plot for the histogram shown in FIG. 5.

A distribution of RTTs, such as is shown in the histogram of FIG. 5 will, if sufficient data exists, provide information about the congested links between the server (or other content source) and client (or other node) of interest. Indeed, because the data should show a periodic pattern, it can be analyzed, after accurate binning, with a Fast Fourier Transform (FFT) (or other analysis tool that will reveal periodicities, such as a wavelet transform, etc.) to devise the relevant period. Such a period plot, an example of which is shown in FIG. 6 for the histogram data shown in FIG. 5, represents the power series provided by the FFT. Note that the main peak 30 in the power series plot appears at approximately 10 msec, with other harmonics also showing up at one-half of 10 msec (peak 32) and one-third of 10 msec (peak 34).

The use of an FFT in this fashion is not a trial exercise. FFTs and other, similar analysis tools, are usually employed to analyze periodicities of a time series. Here, however, the FFT is used to analyze periodicity in a distribution.

After locating the most significant peaks in this power series, one can then obtain the corresponding bandwidth of the communication links, given the size of the packets, according to the following:

Bandwidth [Mbps]=(packet size [kbits])/(FFT peak [msec]).

Figure 7:
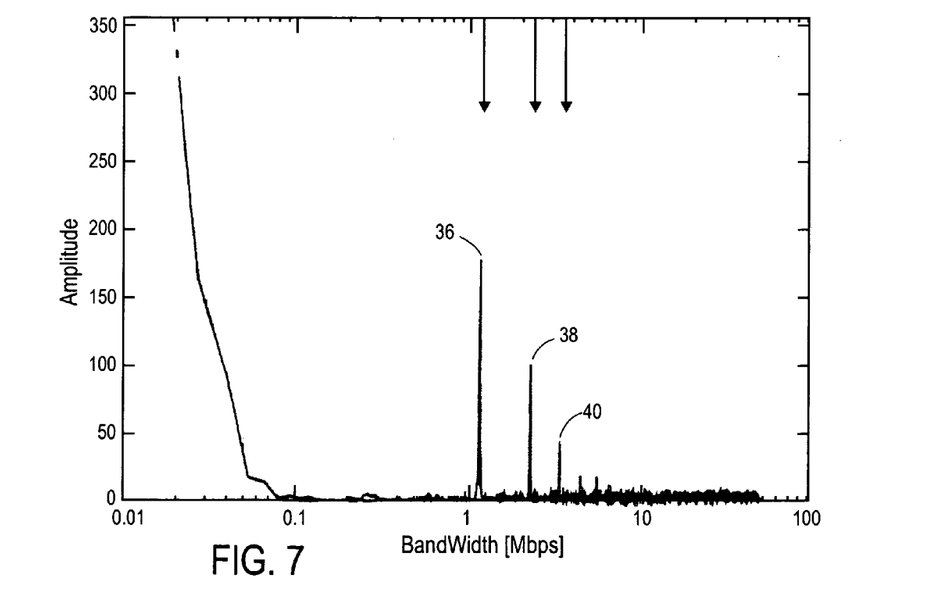
FIG. 7 is a bandwidth plot for the power series plot of FIG. 6.

The bandwidth plot shown in FIG. 7 was obtained using the above expression, after resealing of the power series. Peak 36 is the corresponding bandwidth of peak 30 in FIG. 6. for a packet size of 1500 bytes, a bandwidth of 1.2 Mbps is obtained (which represents a DSL connection in the network under consideration). Note that peaks 38 and 40 appear at harmonics of the bandwidth of the prime frequency, as expected for any periodic system. Artifacts appear in both of the above-described plots at relatively long periods (low bandwidths) and are not relevant to this discussion.

In performing the above-described analysis, care must be taken to choose an RTT bin size much smaller than the delay between two histogram peaks in order to ensure proper resolution of the power series. However, one must be aware that this distribution is more or less affected by the jitter and biases introduced by the routers and the communication links (with their corresponding transmission delays) and that such artifacts affect mainly the accuracy of high bandwidth measurements (when the RTT lag is below 1 msec, typically). The present methods remain valid whether packet loss is being experienced or not; indeed, the packets which have been retransmitted due to packet loss and for which there has been an ACK returned may be discarded from the data used for this monitoring (Karn's algorithm). Perturbations may be introduced into the RTT measurements in cases where the return route (for the ACK packets) is congested.

Figure 8:
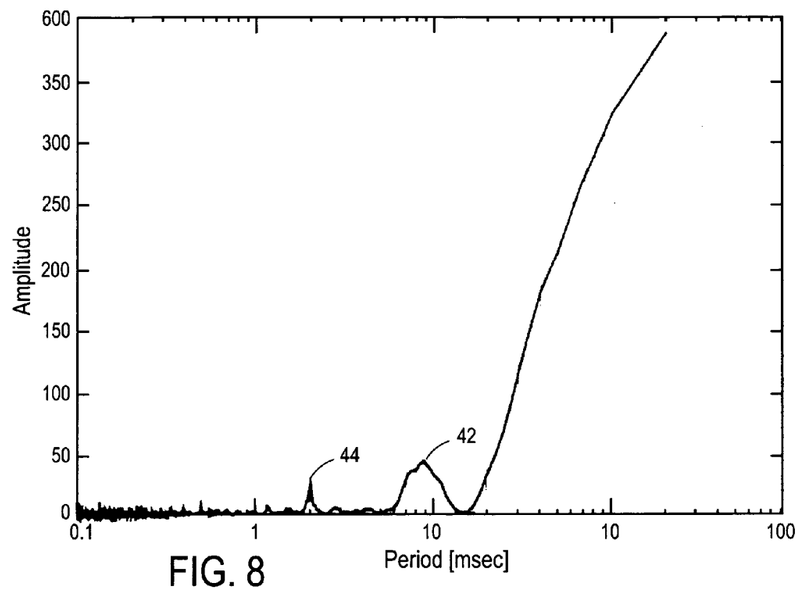
FIG. 8 is a power spectrum plot showing multiple bandwidths of congested links.
Figure 9:
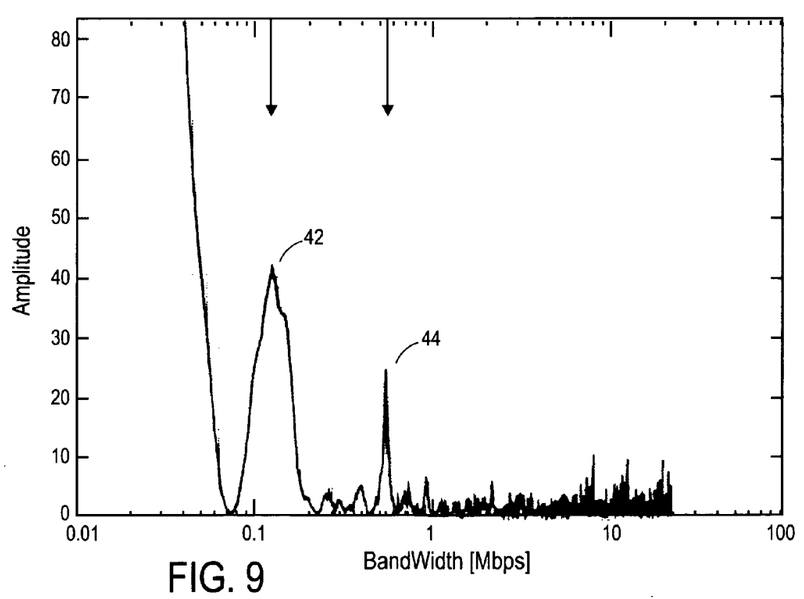
FIG. 9 is a bandwidth plot which corresponds to the power series plot of FIG. 8.

The present method becomes even more powerful when a significant amount of data needs to be analyzed. In such cases, it is possible to distinguish between several period peaks (or bandwidth peaks) corresponding to the bandwidths of different network segments linking the two endpoints of interest. For example, two or more different bandwidths (ignoring, for the moment, harmonics thereof) may be extracted for each analyzed route. In these more complex cases, one may express the RTT as:

$RTT = N_1 * \Delta t_1 + N_2 * \Delta t_2 + \ldots + RTT_0 + \text{Fluctuations}$ where, $N_i$ is any integer value and $\Delta t_i$ is the transfer lag introduced by router "i". An example of these computations is shown in the plots of FIGS. 8 and 9. FIG. 8 is a period (or power spectrum) plot of a histogram for a case where two different bandwidths 42 and 44 have been extracted and FIG. 9 is the corresponding bandwidth plot. Notice that these two bandwidths are truly distinct (and, hence, represent different points of bandwidth mismatches) and are not harmonics of one another.

Under certain circumstances, properties of the cross-traffic can be inferred from the RTT histogram. For example, consider an (large) addition to the RTT from a delay at a router feeding a small bandwidth connection. The buffer occupancy at the moment of arrival of a packet dictates the total wait time for that packet at the router. Thus, the RTT histogram will exhibit a series of peaks corresponding to each additional wait cycle. The time delay between peaks will be a measure of the bandwidth of the bottleneck and will be evident in the FFT or other transform. An example of such a histogram is shown in FIG. 10.

Figure 10:
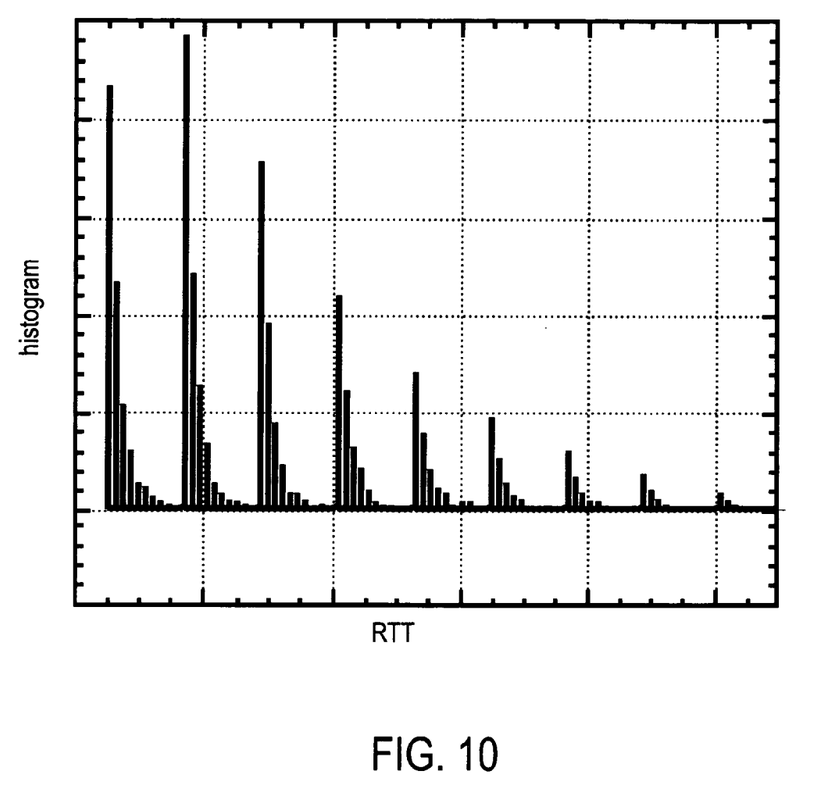
FIG. 10 is an example of a round trip time histogram for a router which is subject to significant cross-traffic.

In addition, the variation in height of the peaks shown in the histogram of FIG. 10 will reflect the varying occupancy of the buffer and therefore may be used as a measure of the cross-traffic and its arrival statistics. Also, the width, i.e., the fine structure, of these peaks will reflect properties of the cross-traffic at the large bandwidth nodes.

As indicated above, the FFT is not the only means of extracting information from an RTT histogram. A wavelet transform may be used to extract the types of information discussed above. In fact, wavelet transforms perform better than FFTs if the traffic flow is stationary. An example of a wavelet transform useful for the types of analyses described herein has the kernel:

$$W(s, T) = \left(\frac{T}{s}\right)^2 e^{-\left(\frac{T}{s}\right)^2}$$

and the amplitude is given by:

$$S(s, T) = \int f(t) \frac{1}{\sqrt{s}} W\left(\frac{t-T}{s}\right) dt$$

Figure 11:
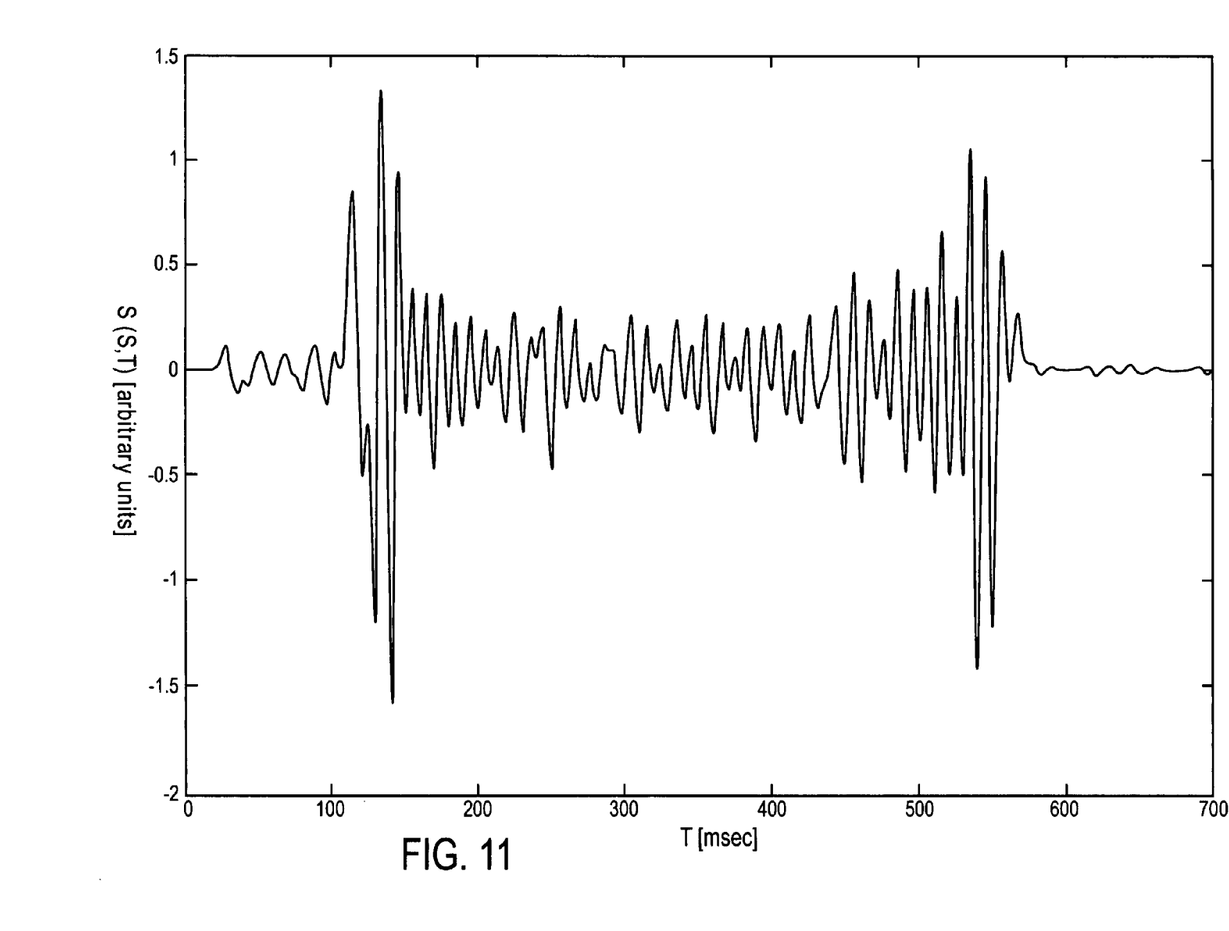
FIG. 11 is a plot showing wavelet transform amplitude versus period for the histogram data of FIG. 5.

The value of "s" can be considered as the scale of the time series f(t) that one wants to examine. FIG. 11 shows a plot of S(s,T) as a function of T for s=5 using the histogram data of FIG. 5. Note that there is a definite oscillation with a period of 10 msec, as was seen with the FFT results of FIG. 6. Other kernels may also be used and it has been found that the results are independent of the ortho-normal set used. Examples of similar analytical tools can be found in U.S. Pat. No. 5,439,483, which is incorporated herein by reference. The wavelet transform (or FFT or other transform) may be performed either in software or in hardware at the control point.

Using the above analysis technique, one can thus extract information regarding a bandwidth bottleneck. Returning to FIG. 4, the control point 12 (which may be a server, a router or another node) may then be operated so as to allow the network to maintain desired throughput. That is, the operating point for the control node 12 may be set to adjust the throughput of packets traveling on communication link 24 to be the discovered bottleneck bandwidth. This operating point will also correspond to a minimized packet loss and a minimized fetch time (i.e., the time taken to download a desired file). In essence, this method exploits the nonlinear dynamics of the chaotic flows of the network traffic; something which conventional congestion control processes simply do not do.

Under the present scheme, the end-to-end packet losses of one or more traffic streams transmitted across a congested network may be reduced by controlling the bandwidths (i.e., the inter-packet delay) of the corresponding traffic streams applied to downstream node(s) of the network from one or more control points along the network topology. This reduction in packet loss results in a reduction in fluctuations or variability of the controlled traffic streams, an increase in bandwidth utilization of a congested link at downstream points and a reduction in times to transmit files (e.g., to an end-user).

To provide for reduced congestion on communication link 22, which is an output from node 10, the output bandwidth (e.g., packets/time interval) from the control node 12 is limited to a value determined from monitoring the downstream congestion conditions using the above-described techniques. That is, by varying the rate of traffic transmitted on communication link 24, which couples the output of node 12 to an input of node 10, for example by controlling the delays between packets, downstream congestion control is achieved.

Of course, because the network is dynamic in nature, the operating points change frequently, depending on the traffic conditions on the uncontrolled streams. Using the present monitoring and control techniques, traffic on the controlled streams may be throttled and/or allowed to flow accordingly, so as to maximize throughput for those streams.

The value of the controlled bandwidth can be set by controlling the buffer occupancy at node 12 (and changes thereto). When a bandwidth bottleneck is found, the corresponding value is used as the output bandwidth over communication link 24 and packets are buffered at node 12 accordingly. Periodically, node 12 can reassess whether the operating point has shifted and change the control bandwidth accordingly. In this way, downstream congestion is minimized and fewer packets are expected to be lost.

Thus a scheme for determining network congestion and link capacities in a computer network has been described. By reducing the end-to-end packet loss using the present monitoring and control mechanisms, traffic flow across the entire network topology is improved. The control methodology described herein can be applied on a port-by-port, link-by-link and/or traffic flow-by-traffic flow basis. That is, the control methods can be introduced at the physical or logical level, allowing true end-to-end quality of service (QoS) to be provided. It should be remembered that although the foregoing description and accompanying figures discuss and illustrate specific embodiments, the broader scope of present invention should be measured only in terms of the claims that follow.

What is claimed is:

1. A method, comprising measuring packet round trip times within a communication network, organizing numbers of occurrences of the packet round trip time measurements as an invariant distribution; applying an analytical tool to the invariant distribution to derive a plot exhibiting periodic peaks; and extracting information from the periodic peaks to evaluate regarding congestion conditions within the network, wherein the extracting the information to evaluate regarding the congestion conditions includes determining a bandwidth of one or more communication links from the periodic peaks.

2. The method of claim 1 wherein the analytical tool is selected from the list comprising a Fourier transform and a wavelet transform.

3. The method of claim 1 wherein extraction of information regarding congestion conditions comprises determining period information from the periodic peaks.

4. The method of claim 1 further comprising using the bandwidth information to set a control bandwidth output of a network node.

5. The method of claim 4 wherein the control bandwidth output is set by adjusting inter-packet transmission times at the network node.

6. The method of claim 5 further comprising adjusting the control bandwidth output in response to changing network congestion conditions.

7. A method, comprising controlling inter-packet transmission times at a node of a communication network according to congestion conditions within the network, the congestion conditions being determining by measurement of packet round trip times within the network; organizing numbers of occurrences of the packet round trip time measurements as an invariant distribution; applying an analytical tool to the invariant distribution to derive a plot exhibiting periodic peaks, and extracting a bandwidth information to evaluate one or more congested links within the network from the periodic peaks.

8. The method of claim 7 further comprising identifying bandwidth bottlenecks from the bandwidth information.

9. The method of claim 8 wherein the inter-packet transmission times are controlled so as to provide a packet bandwidth approximately equal to a bandwidth of at least one of the bandwidth bottlenecks.

10. The method of claim 7 wherein the analytical tool is selected from the list comprising a Fourier transform and a wavelet transform.

11. A method comprising estimating congestion conditions in a communication network from bandwidth bottleneck information obtained through a plot exhibiting periodic peaks, the plot derived from an invariant distribution of numbers of occurrences of measurements of packet round trip times within the network applied with an analytical tool, wherein the bandwidth bottleneck information to evaluate regarding the congestion conditions includes determining a bandwidth of one or more communication links from the periodic peaks.

12. The method of claim 11 further comprising controlling packet transmissions from a node of the network according to the bandwidth bottleneck information.

13. The method of claim 11 wherein the analytical tool is selected from the list comprising a Fourier transform and a wavelet transform.

14. The method of claim 11 further comprising controlling inter-packet transmission times at a node of the network according to the bandwidth bottleneck information.

* * * * *